United States Patent
Mizutani

(10) Patent No.: US 7,642,505 B2
(45) Date of Patent: Jan. 5, 2010

(54) PHOTOELECTRIC ENCODER WITH A TRANSPARENT PROTECTIVE MATERIAL HAVING A THICKNESS EQUAL TO OR GREATER THAN A DEPTH OF FOCUS OF AN IMAGE FORMING OPTICAL SYSTEM DISPOSED ON THE SURFACE OF A SCALE

(75) Inventor: Miyako Mizutani, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 45 days.

(21) Appl. No.: 12/128,201

(22) Filed: May 28, 2008

(65) Prior Publication Data
US 2008/0302953 A1     Dec. 11, 2008

(30) Foreign Application Priority Data
May 28, 2007   (JP)   ............................. 2007-140557

(51) Int. Cl.
*G01D 5/34*   (2006.01)

(52) U.S. Cl. ............................. 250/231.13; 250/237 G

(58) Field of Classification Search ............ 250/231.13, 250/239, 216, 237 R, 237 G; 341/11, 13
See application file for complete search history.

(56) References Cited

U.S. PATENT DOCUMENTS 5,955,727 A * 9/1999 Itoh ...................... 250/231.13

FOREIGN PATENT DOCUMENTS

| JP | 2-167427 | 6/1990 |
| JP | 2-167428 | 6/1990 |
| JP | 2-176420 | 7/1990 |
| JP | 2004-264295 | 9/2004 |

\* cited by examiner

*Primary Examiner*—Que T Le
(74) *Attorney, Agent, or Firm*—Rankin, Hill & Clark LLP

(57) ABSTRACT

In a photoelectric encoder including a scale (14, 16, 18) for making a relative move and an image forming optical system (22, 24), adapted to detect relative displacement of the scale, a transparent protective material (40, 42) having a thickness t equal to or greater than the depth of focus (DOF) of the image forming optical system is disposed on the lattice (15, 17, 19) side surface of the scale. The transparent protective material can be transparent tape 40 bonded to the lattice side surface of the scale or a transparent protective material 42 applied to the lattice side surface of the scale. The surface of the transparent protective material can have hydrophilicity or lipophilicity.

10 Claims, 8 Drawing Sheets

PHOTOELECTRIC ENCODER WITH A TRANSPARENT PROTECTIVE MATERIAL HAVING A THICKNESS EQUAL TO OR GREATER THAN A DEPTH OF FOCUS OF AN IMAGE FORMING OPTICAL SYSTEM DISPOSED ON THE SURFACE OF A SCALE

TECHNICAL FIELD

The present invention relates to a photoelectric encoder and in particular to a photoelectric encoder capable of improving reliability for scale dirt, stabilizing the signal strength, and improving the signal detection efficiency, suited for use as a photoelectric encoder including a scale having an optical grating and an image forming optical system which can move relatively to the scale, adapted to detect relative displacement of the scale using interference of light.

RELATED ART

A photoelectric encoder of grating interference type for detecting relative displacement of a scale using interference of light is known as described in patent documents 1 to 3.

If the photoelectric encoder of grating interference type is of transmission type, light projected onto an index scale 12 from a light source 10 and diffracted on a grating 13 is again diffracted on a grating 15 on a main scale (simply, referred as scale) 14 to produce a light and dark interference fringe, this interference fringe is detected on a light reception element 20, and displacement of the scale 14 is detected, as shown in FIG. 1.

On the other hand, if the photoelectric encoder of grating interference type is of reflection type, an interference fringe is generated using light diffraction/interference through a phase grating 17 on a scale 16 as shown in FIG. 2 as with the transmission type shown in FIG. 1 or a portion where a phase grating 19 of a scale 18 does not exist is reflected and becomes a light part and a portion where the phase grating 19 exists becomes a dark part because of interference in such a manner that the phase difference between reflected light on the surface of the phase grating 19 and that on the bottom of the phase grating 19 becomes light wavelength/2 (a value obtained by dividing the light wavelength by 2), as shown in FIG. 3.

[Patent document 1] Japanese Patent Application Publication No. Hei. 2-167427

[Patent document 2] Japanese Patent Application Publication No. Hei. 2-167428

[Patent document 3] Japanese Patent Application Publication No. Hei. 2-176420

[Patent document 4] Japanese Patent Application Publication No. 2004-264295

However, the transmission type and the reflection type have a problem of a decrease in the signal strength if dirt exists on the scale surface. That is, in the transmission type in FIGS. 1 and 2, if the light path length changes due to refraction because of dirt S on the scale surface and the direct current (DC) component of an interference fringe arriving at the light reception element 20 increases, worsening the contrast of the interference fringe, as in FIGS. 4 and 5. On the other hand, in the reflection type in FIG. 3, a phase difference changes due to dirt S, no interference occurs, and the direct current (DC) component increases, worsening the contrast of the interference fringe, as in FIG. 6.

Such a problem is also involved in a photoelectric encoder including a lens optical system for image formation (also called image forming optical system) as described in patent document 4.

SUMMARY

It is therefore an object of the invention to improve reliability for scale dirt, stabilize the signal strength, and improve the signal detection efficiency.

To accomplish the object, according to the invention, there is provided a photoelectric encoder including a scale and an image forming optical system which move relatively to each other, adapted to detect relative displacement of the scale, wherein a transparent protective material having a thickness equal to or greater than a depth of focus of the image forming optical system is disposed on a surface of the scale where a grating is provided.

The transparent protective material can be transparent tape bonded to the surface of the scale where the grating is provided or a transparent protective material applied to the surface of the scale where the grating is provided.

The surface of the transparent protective material can have hydrophilicity or lipophilicity by using an oxide such as a titanium oxide, a titanium dioxide or the like. More specifically, the surface of the transparent protective material may be covered by a titanium oxide film or the transparent protective material may be made of a titanium oxide, so that the transparent protective material can have hydrophilicity. The surface of the transparent protective material may be covered by a titanium dioxide film or the transparent protective material may be made of a titanium dioxide, so that the transparent protective material can have lipophilicity. In an environment in which water is used, the transparent protective material has hydrophilicity, so that it is possible to prevent the water droplet from forming on the transparent protective material or the water from being accumulated on the transparent protective material because the water spreads on the transparent protective material. In an environment in which oil is used as in a machine tool, the transparent protective material has lipophilicity, so that it is possible to prevent the oil droplet from forming on the transparent protective material or the oil from being accumulated on the transparent protective material because the oil spreads on the transparent protective material. Therefore, it is possible to prevent the optical influence by the water droplet or oil droplet from occurring.

The transparent protective material can have the characteristic of a filter.

The image forming optical system can include an aperture.

According to the invention, the transparent protective material has the thickness equal to or greater than the depth of focus (DOF) of the image forming optical system and thus the effect on image formation is small. Therefore, reliability for scale dirt is improved, the signal strength is stabilized, and the signal detection efficiency is improved. Moreover, the dirt portion spreads on the transparent protective material by means of the transparent protective material having hydrophilicity or lipophilicity, for example, the refractive power caused by the scale dirt lessens, and the interference fringe scarcely changes. Therefore, reliability for scale dirt is further improved, the signal strength is further stabilized, and the signal detection efficiency is further improved.

DETAILED DESCRIPTION

Embodiments of the invention will be discussed in detail with reference to the accompanying drawings.

To begin with, a disposing method of a transparent protective material will be discussed.

Figure 7:
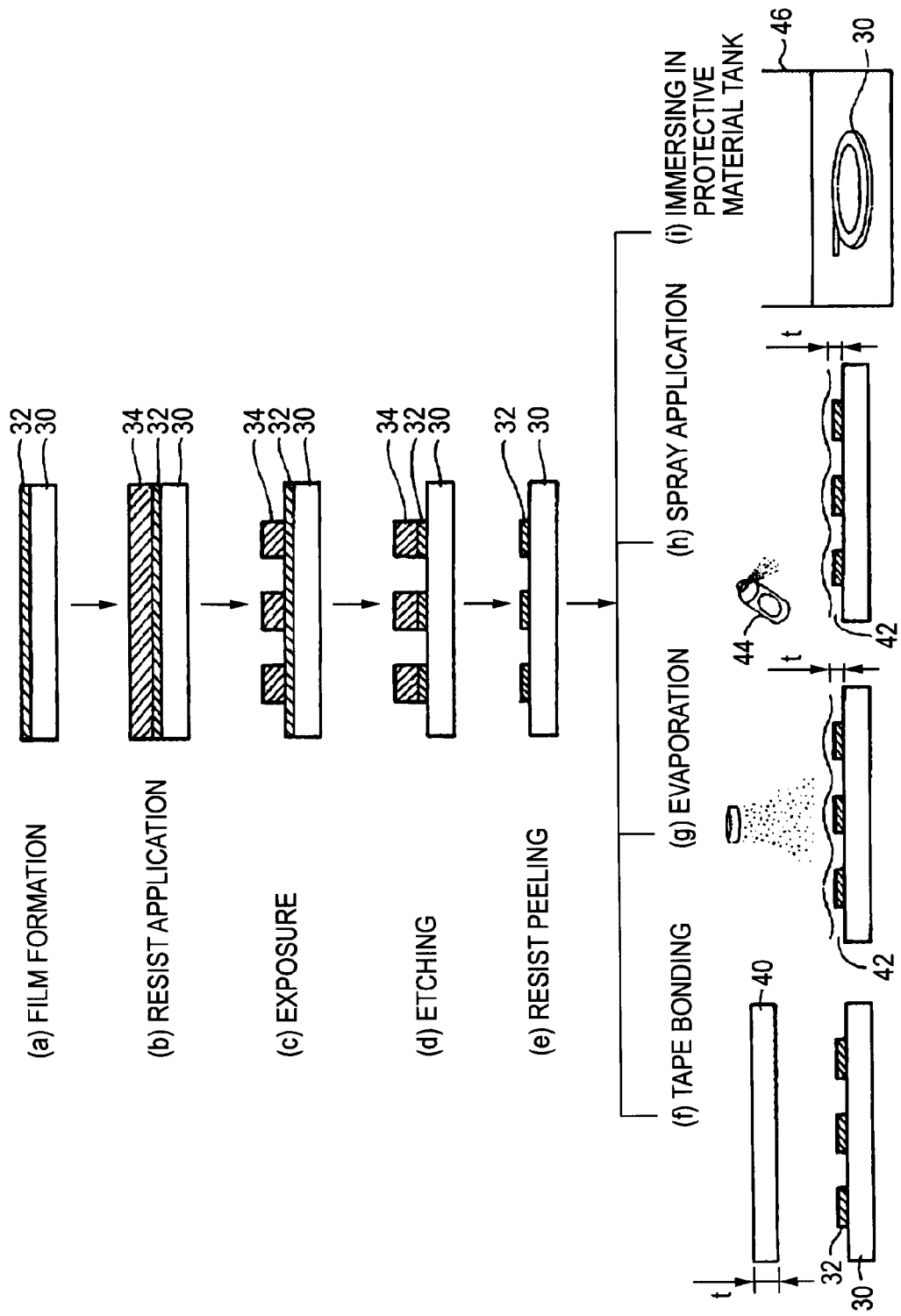
FIG. 7 is a drawing to show a disposing method of a transparent protective material for a scale of a photoelectric encoder according to the invention.

A scale 14 having a grating 15 is formed by (a) forming a film 32 which becomes a grating on a base 30 made of glass or metal, for example, (b) applying a resist 34 onto the film, (c) exposing to light and removing a part of the resist 34, (d) etching and removing a part of the film 32, and (e) peeling off the resist 34, as shown in FIG. 7. After forming the grating 15, a transparent protective material is disposed by bonding transparent tape 40 made of glass or resin (PET film, etc.,) to the grating 15 side surface of the scale 14 by adhesiveness of the tape or with an adhesive as shown in (f), evaporating a transparent protective material 42 onto the grating side surface as shown in (g), applying a transparent protective material 42 to the grating side surface with a spray 44 as shown in (h), or immersing the whole in a protective material tank 46 as shown in (i).

A thickness t of each of the transparent protective materials 40 and 42 is equal to or greater than the depth of focus (DOF) of an image forming optical system.

Figure 1:
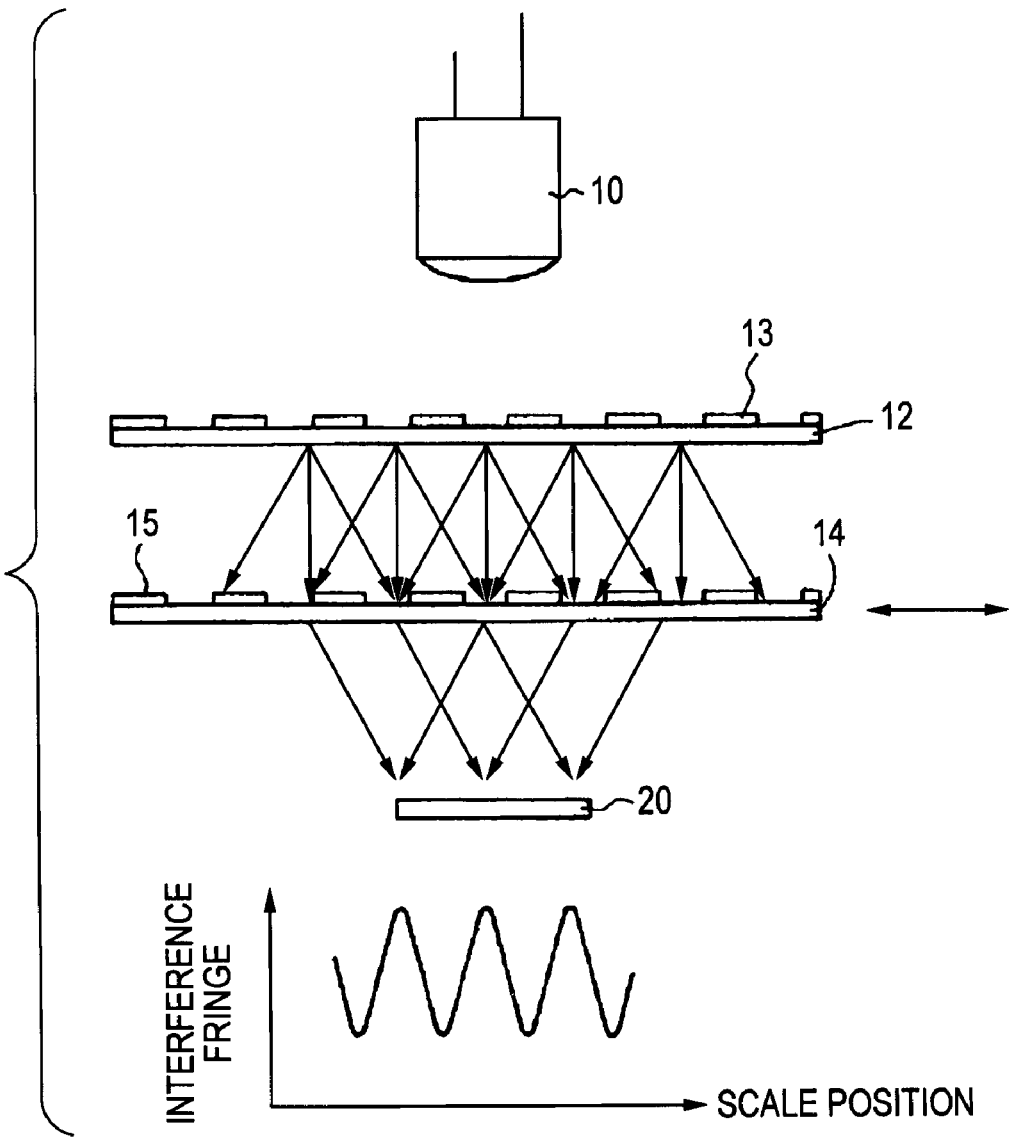
FIG. 1 is a drawing to show the measurement principle of a grating interference type transmission photoelectric encoder in a related art.
Figure 8:
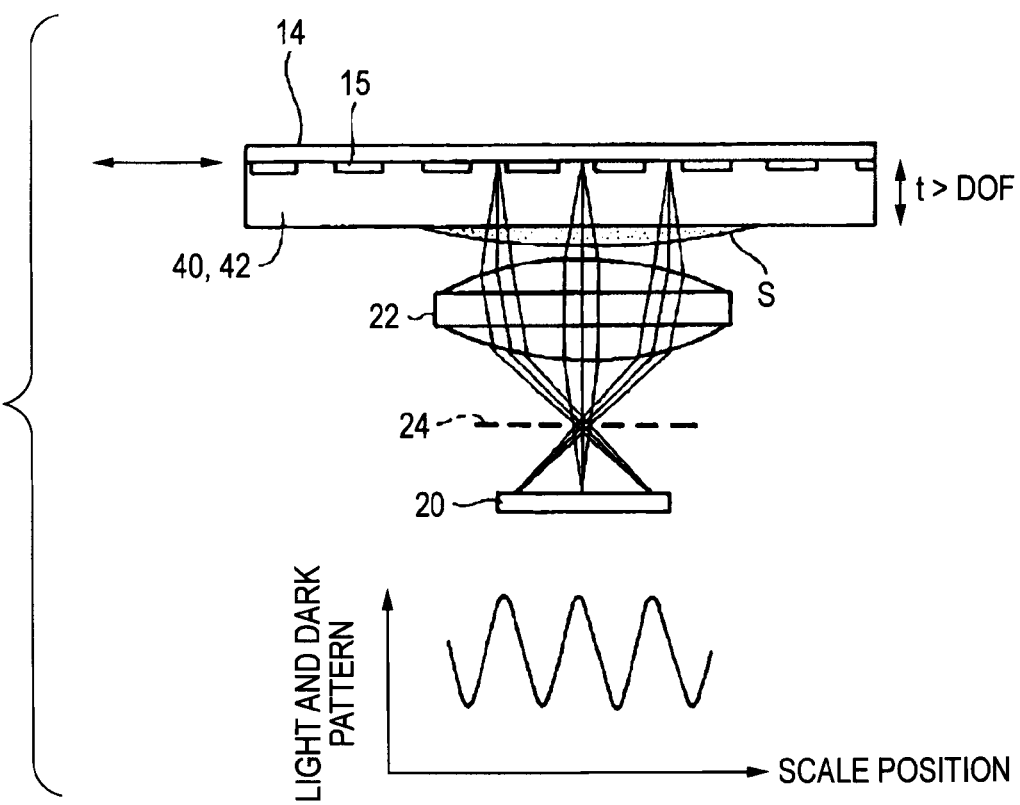
FIG. 8 is a drawing to show a first embodiment of the invention applied to a transmission encoder like that in FIG. 1.

FIG. 8 shows a first embodiment of the invention applied to a transmission encoder like that in FIG. 1 having an image forming optical system made of a lens 22. As shown in FIG. 8, a transparent protective material 40 or 42 is disposed on a grating 15 side surface of a scale 14, whereby dirt S is deposited on the transparent protective material 40 or 42 rather than on the grating 15 face of the scale 14 and the dirt portion spreads because of hydrophilicity or lipophilicity. Therefore, the refractive power lessens and an interference fringe scarcely changes. Further, the thickness t of the transparent protective material 40 or 42 is larger than the DOF and thus the effect on image formation through the lens 22 is small.

Particularly, if an aperture 24 is added to the focal position of the lens 22 as indicated by the dashed line in the figure, the DOF lessens, so that the thickness t of the transparent protective material 40 or 42 can be thinned.

Figure 2:
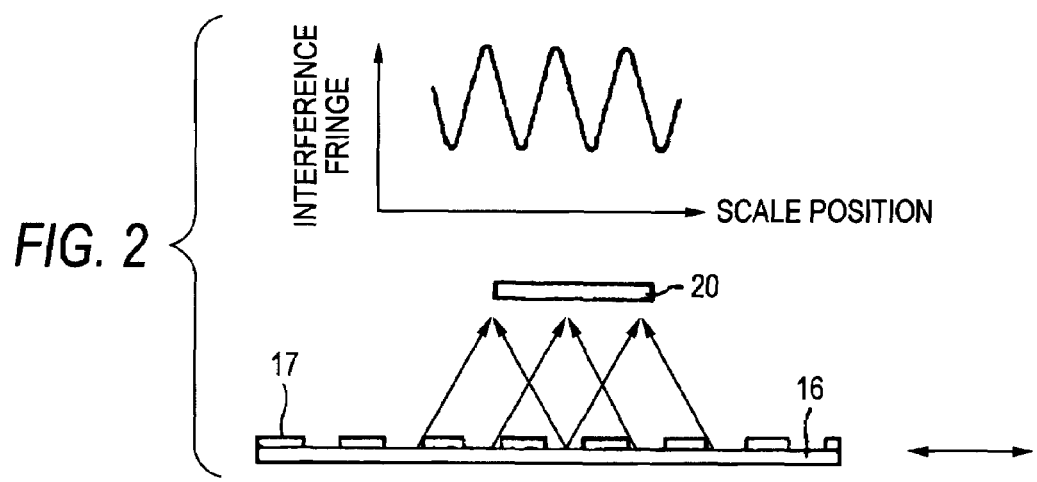
FIG. 2 is a drawing to show the measurement principle of an example of a grating interference type transmission photoelectric encoder in a related art.
Figure 9:
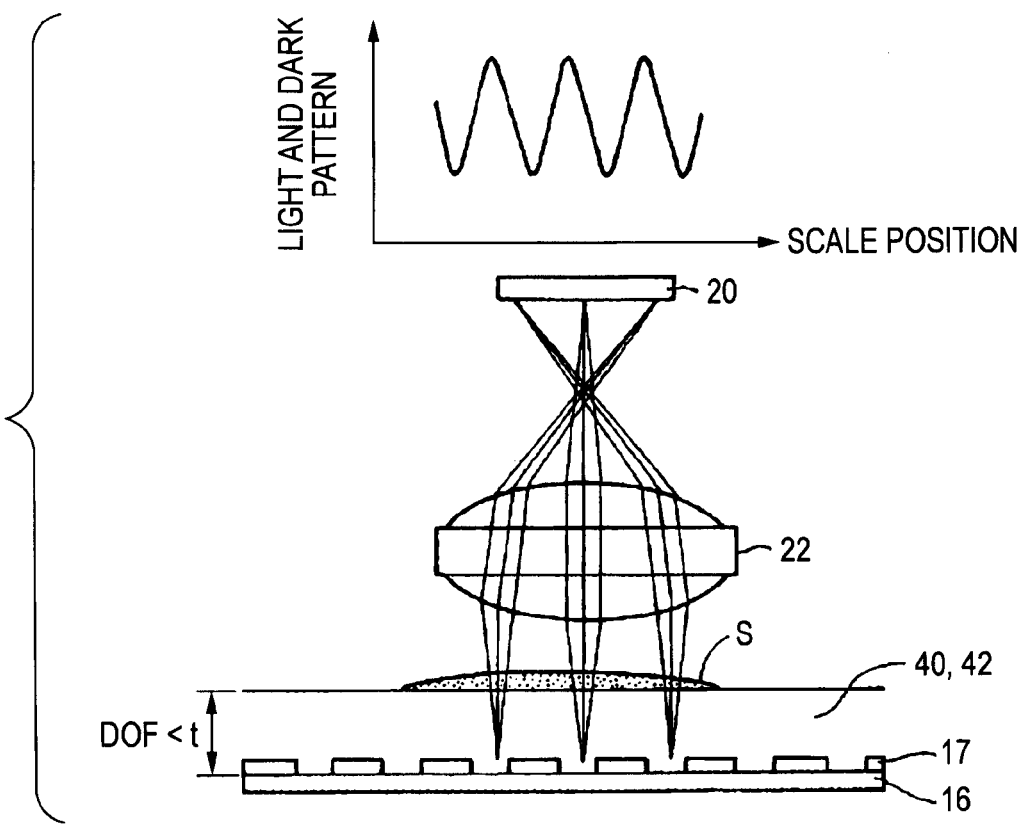
FIG. 9 is a drawing to show a second embodiment of the invention applied to a reflection encoder like that in FIG. 2.

Next, FIG. 9 shows a second embodiment of the invention applied to a reflection encoder as shown in FIG. 2.

Also in the embodiment, dirt S spreads on a transparent protective material 40 or 42 and thus the refractive power lessens and an interference fringe scarcely changes. Further, thickness t of the transparent protective material 40 or 42 is larger than the DOF and thus the effect on image formation through a lens 22 is small.

Figure 3:
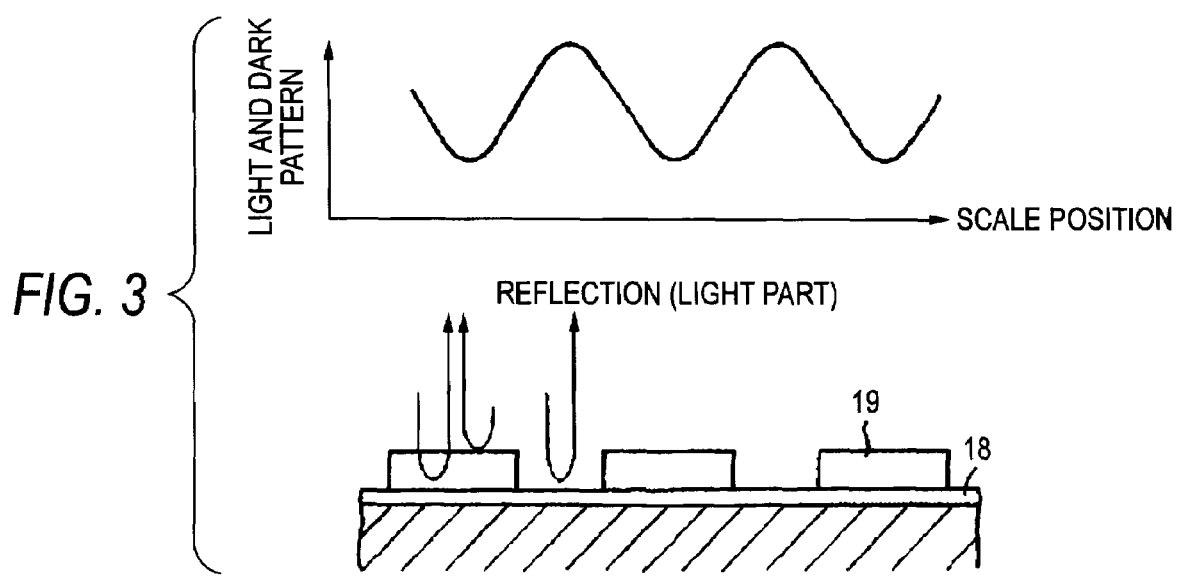
FIG. 3 is a drawing to show the measurement principle of another example of a grating interference type transmission photoelectric encoder in a related art.
Figure 4:
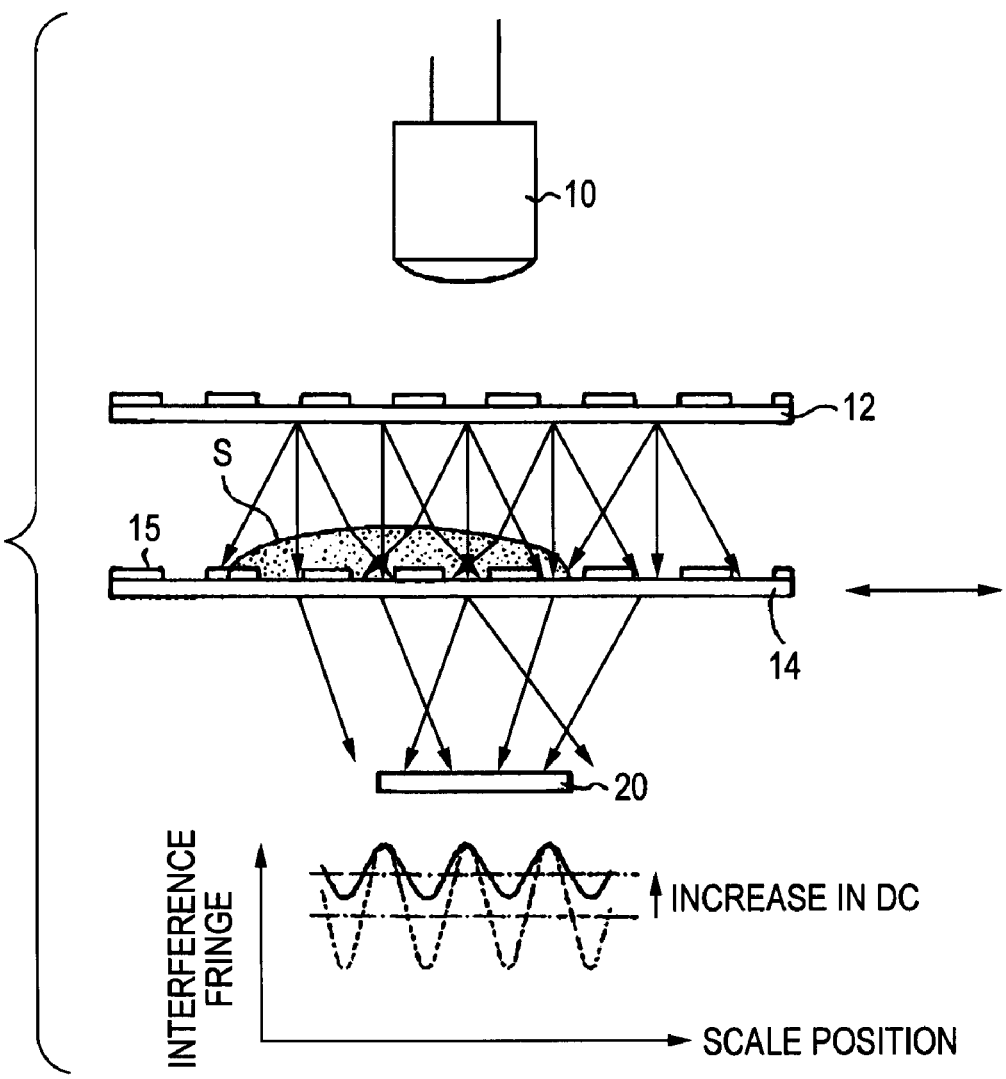
FIG. 4 is a drawing to show change in interference fringe contrast caused by dirt in the transmission encoder in FIG. 1.
Figure 5:
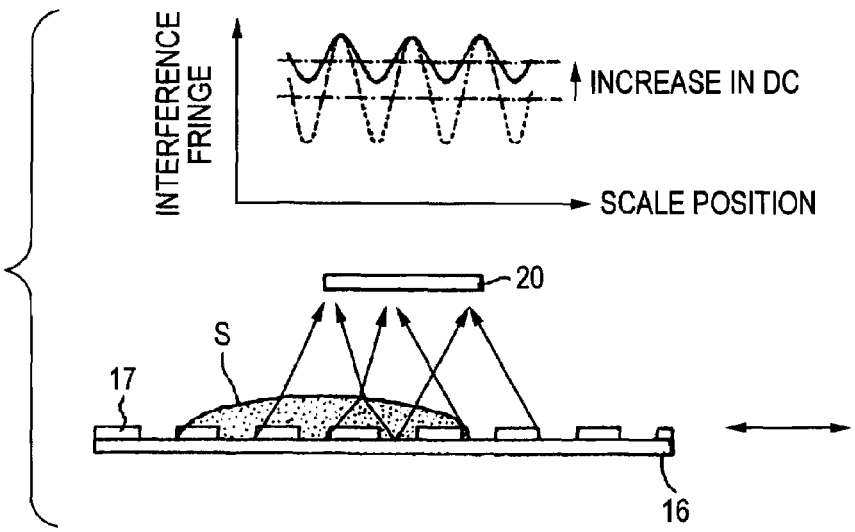
FIG. 5 is a drawing to show change in interference fringe contrast caused by dirt in the reflection encoder in FIG. 2.
Figure 6:
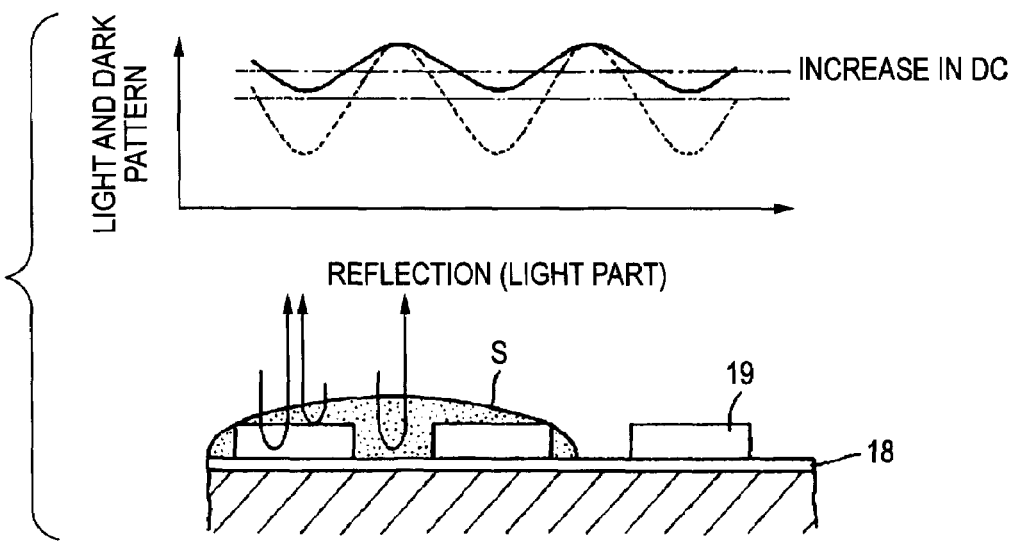
FIG. 6 is a drawing to show phase difference change caused by dirt in the reflection encoder in FIG. 3.
Figure 10:
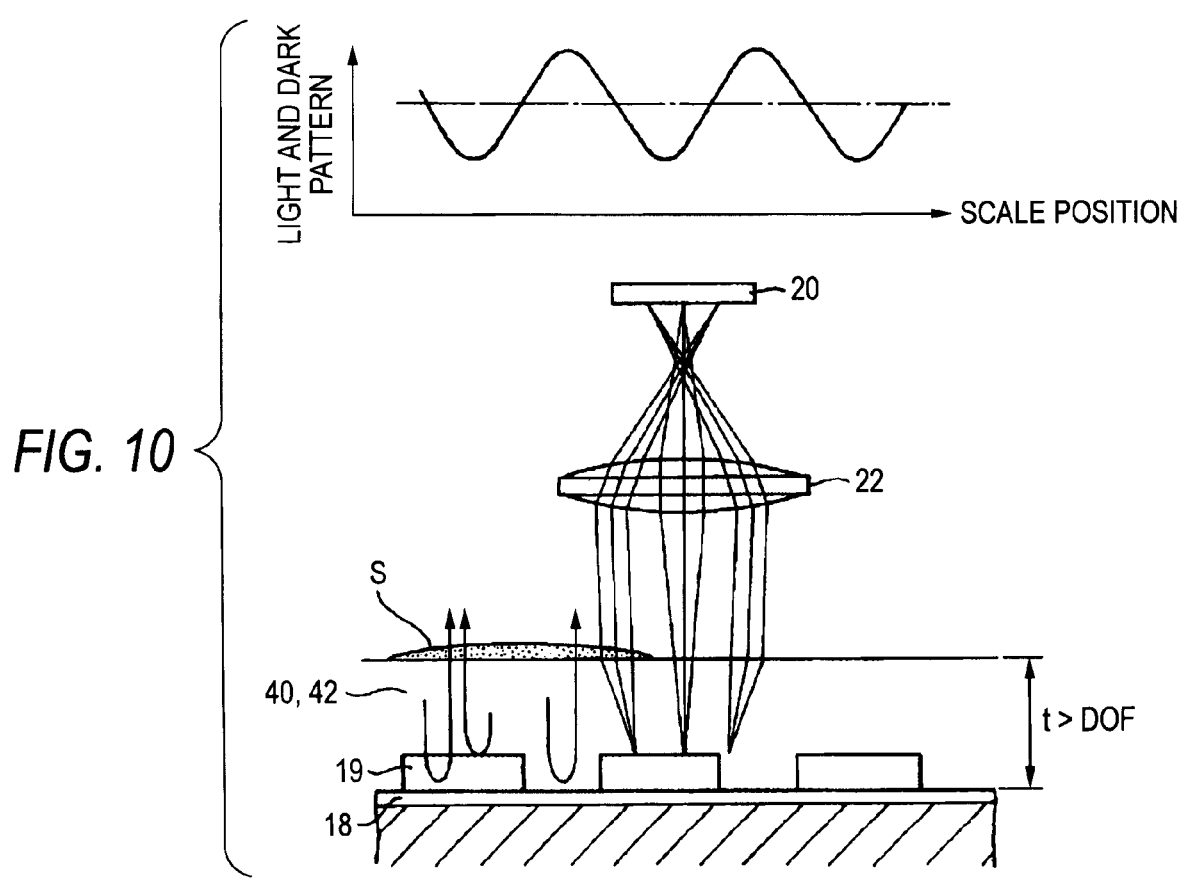
FIG. 10 is a drawing to show a third embodiment of the invention applied to a reflection encoder like that in FIG. 3.

Next, FIG. 10 shows a third embodiment of the invention applied to a reflection encoder as shown in FIG. 3.

Also in the embodiment, the portion of dirt S spreads and thus an interference fringe scarcely changes. Further, thickness t of a transparent protective material 40 or 42 is larger than the DOF and thus the effect on image formation through a lens 22 is small.

The transparent protective material can be implemented as a band-pass filter formed by multilayer coating by evaporation, for example, and can be provided with a function of removing external visible light, etc., for example, when an infrared light source is used.

Further, in the reflection encoder as shown in FIGS. 2 and 3, as with the first embodiment of FIG. 1, the aperture 24 may be added to the focal position of the lens 22, and in this case, since DOF lessens, the thickness t of the transparent protective material 40 or 42 can be thinned.

What is claimed is:

1. A photoelectric encoder comprising a scale and an image forming optical system which move relatively to each other, adapted to detect relative displacement of the scale,
wherein a transparent protective material having a thickness equal to or greater than a depth of focus of the image forming optical system is disposed on a surface of the scale where a grating is provided.

2. The photoelectric encoder as claimed in claim 1 wherein the transparent protective material is a transparent tape bonded to the surface of the scale where the grating is provided.

3. The photoelectric encoder as claimed in claim 1 wherein the transparent protective material is a transparent protective material applied to the surface of the scale where the grating is provided.

4. The photoelectric encoder as claimed in claim 1 wherein a surface of the transparent protective material has hydrophilicity.

5. The photoelectric encoder as claimed in claim 1 wherein a surface of the transparent protective material has lipophilicity.

6. The photoelectric encoder as claimed in claim 1 wherein the transparent protective material has the characteristic of a filter.

7. The photoelectric encoder as claimed in claim 1 wherein the image forming optical system includes an aperture.

8. The photoelectric encoder as claimed in claim 4 wherein the transparent protective material is made of a titanium oxide.

9. The photoelectric encoder as claimed in claim 5 wherein the transparent protective material is made of a titanium dioxide.

10. The photoelectric encoder as claimed in claim 6 wherein the transparent protective material is a band-pass filter formed by multilayer coating by evaporation.

* * * * *